United States Patent [19]

Suzuki

[11] Patent Number: 4,662,432
[45] Date of Patent: May 5, 1987

[54] VIBRATION DAMPING SYSTEM OF AUTOMOTIVE VEHICLE

[75] Inventor: Morio Suzuki, Zama, Japan

[73] Assignee: Nissan Motor Co., Ltd., Yokohama, Japan

[21] Appl. No.: 744,991

[22] Filed: Jun. 17, 1985

[30] Foreign Application Priority Data

Jun. 19, 1984 [JP] Japan .................. 59-124577

[51] Int. Cl.$^4$ .................. F28F 9/00
[52] U.S. Cl. .................. 165/41; 165/67; 165/69; 180/68.4
[58] Field of Search .................. 165/67, 69; 180/68.4, 180/68.6; 165/148, 153, 41; 248/74.1

[56] References Cited

U.S. PATENT DOCUMENTS

| 3,123,170 | 3/1964 | Bryant | 180/68.4 |
| 3,248,076 | 4/1966 | Ferguson | 180/68.4 |
| 3,763,953 | 10/1973 | Yoda et al. | 180/68.4 |
| 4,367,793 | 1/1983 | MacIntosh | 180/68.4 |
| 4,510,991 | 4/1985 | Kawahira | 165/153 |
| 4,538,697 | 9/1985 | Mori et al. | 180/68.4 |

FOREIGN PATENT DOCUMENTS 1241650 12/1959 France .................. 248/74.1

57-84223 5/1982 Japan .

OTHER PUBLICATIONS

Patents Abstracts of Japan, "Vibration Absorber of Vehicle", vol. 6, No. 172 (Sep. 1982).
Patents Abstracts of Japan, "Resonance Suppressor of Vehicle", vol. 6, No. 138 (Jul. 1982).

Primary Examiner—William R. Cline
Assistant Examiner—Richard R. Cole
Attorney, Agent, or Firm—Schwartz, Jeffery, Schwaab, Mack, Blumenthal & Evans

[57] ABSTRACT

A vibration damping system of an automotive vehicle consists of a radiator which is fluidly connected through flexible radiator hoses to an engine and elastically supported through elastic members to a vehicle body. The radiator hoses are fixed at the vicinity of an end section thereof to the vehicle body in such a manner that the radiator has a pitching natural frequency separate from a bouncing natural frequency. Additionally, the elastic members are so constructed and arranged to allow the bouncing natural frequency of the radiator to be separate from the vehicle body flexural vibration resonance frequency and from the resonance frequency of a steering column, thereby effectively damping low frequency vibration of the vehicle.

16 Claims, 16 Drawing Figures

VIBRATION DAMPING SYSTEM OF AUTOMOTIVE VEHICLE

BACKGROUND OF THE INVENTION

1. Field of the Invention

The present invention relates in general to a vibration damping system for an automotive vehicle, and more particularly to a vibration damping system for damping low frequency vibration in an automotive vehicle under the action of a radiator serving as a dynamic damper.

2. Description of the Prior Art

In order to effectively dampen automotive vehicle low frequency vibration, which deteriorates the drive feeling of a driver, i.e., roads feel and the comfort of all vehicle occupants, it has already been proposed that a radiator serves as a dynamic damper by being elastically supported relative to the vehicle body through elastomeric members, so that the natural vibration frequency of the radiator in the vertical direction is shifted from the resonance frequency of the vehicle body in flexural vibration. However, in practice, the vibration of the radiator includes pitching, rolling and the like in addition to vertical, i.e., "bouncing" vibration. The various types of vibration combine, and as a result, although the bouncing natural frequency of the radiator does not overlap the vehicle body flexural vibration resonance frequency, the pitching natural frequency unavoidably still lies within a range of the vehicle body flexural vibration resonance frequency, thus making it difficult to cause the radiator to effectively serve as the dynamic damper. Furthermore, when the engine vibrates, for example, due to surging caused by sudden speed changes, radiator hoses are pulled or compressed thereby to cause the radiator to roll.

SUMMARY OF THE INVENTION

In accordance with the present invention, a vibration damping system for an automotive vehicle consists of a radiator which is fluidly connected with an engine through elastic radiator hoses. The radiator is elastically connected to vehicle body through elastic members which are constructed and arranged to allow the natural vertical vibration bouncing frequency of the radiator to be separated from the flexural vibration resonance frequency of the vehicle body and from the resonance frequency of a steering column on which a steering wheel is mounted. Additionally, the radiator hoses are fixed at the vicinity of an end section thereof to the vehicle body in such a manner that the radiator has a first natural frequency in pitching and a second natural frequency in bouncing, the first and second natural frequencies being separate from each other.

Accordingly, the spring constant of the radiator hoses in the axial direction becomes larger than that in the vertical direction, and therefore the spring constant of the radiator hoses acts only on pitching resonance vibration and does not act on bouncing resonance vibration. In addition to this, by virtue of the fact that the bouncing natural frequency of the radiator is set to be separate from the vehicle body flexural vibration resonance frequency and from the steering column resonance frequency, the radiator and the elastic members do not make their resonance vibration both at the resonance frequencies, thereby effectively suppressing or damping vehicle body flexural vibration and steering column vibration.

BRIEF DESCRIPTION OF THE DRAWINGS

The features and advantages of the vibration damping system according to the present invention will be more clearly appreciated from the following description taken in conjunction with the accompanying drawings in which same reference numerals and characters desinate same elements and matters, and in which.

DETAILED DESCRIPTION OF THE INVENTION

To facilitate understanding the present invention, a brief reference will be made to a low frequency vibration generation mechanism for automotive vehicles depicted in FIGS. 1 to 3 and to a conventional vibration damping system for low frequency vibration depicted in FIGS. 4 to 9. It is known that low frequency vibration of automotive vehicles is caused in general by (1) the engine speed change during engine idling, (2) the non-uniformness in mass distribution of a tire and in rubber hardness along the periphery of the tire, (3) the non-uniformness in wear of a tire, and (4) the non-uniformness of a rotatable section of a brake device.

Figure 1:
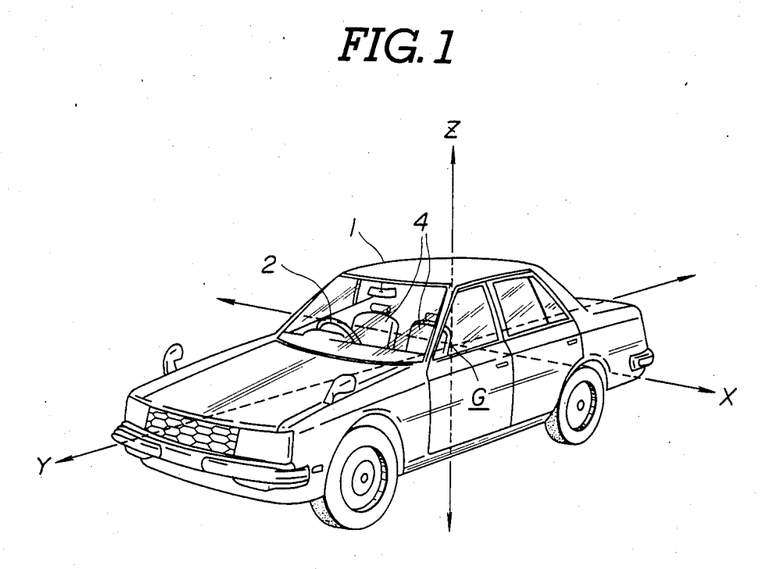
FIG. 1 is a perspective view of an automotive vehicle, illustrating the vibration modes of the automotive vehicle.
Figure 2:
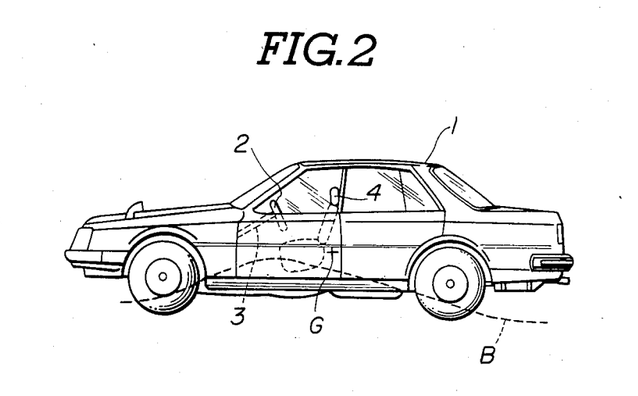
FIG. 2 is a side view of the vehicle of FIG. 1.
Figure 3:
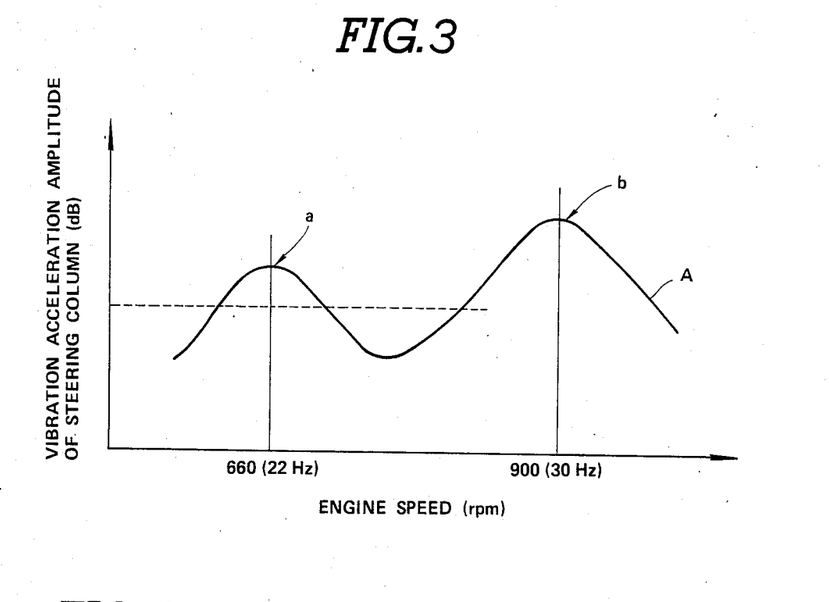
FIG. 3 is a graph showing the vibation characteristic curve of a steering system of the vehicle shown in FIG. 1.

In the event that an automotive vehicle as shown in FIGS. 1 and 2 vibrates at low frequencies by the above-mentioned reasons, the vibration includes a variety of vibration components, for example, the vibration of sprung mass and unsprung mass, and the elastic vibration of a vehicle body 1, which vibrations particularly affect riding comfort. The sprung mass vibration mainly includes bouncing (parallel vibration in the direction of an axis Z), pitching (rotational vibration around an axis X, and rolling (rotational vibration around an axis y), while the vehicle body elastic vibration includes flexural vibration and torsional tortional vibration of the vehicle body 1.

Now assuming that the vehicle body 1 is vibrated at low frequencies as discussed above, a steering system is also subjected to vibration so that a steering wheels vibrates. This steering system vibration affects the driving feeling of a driver sitting in one of the seats 4. In this connection, the relationship between vibration acceleration amplitude of a steering column 3 of the steering system and engine speed is shown in FIG. 3. According to a steering systen (column) vibration curve A in FIG. 3, an amplitude peak a of the steering column 3 due to the resonance in flexural vibration of the vehicle body 1 exists at an engine speed of about 660 rpm, and another amplitude peak b of the same due to the resonance of the steering column 3 exists at an engine speed of about 900 rpm. The flexural vibration of the vehicle body 1 is shown by a broken line B in FIG. 2, indicating the node of the vibration. In FIGS. 1 and 2, the character G indicates the center of gravity of the vehicle body 1.

Thus, a resonance point in flexural vibration of the vehicle body 1 exists within an engine idling speed range, and such a resonance phenomena is known to arise in most automotive vehicles. It is to be noted that since the second harmonics has an adverse influence on a vibration system, the vibration frequency at the peak a corresponds to about 22 Hz, while the vibration frequency at the peak b corresponds to about 30 Hz. Such low frequency vibrations are transmitted to vehicle occupants, so that the occupants become uncomfortable and the steering system is vibrated thereby to largely deteriorate the driving feeling of the driver.

Figure 4:
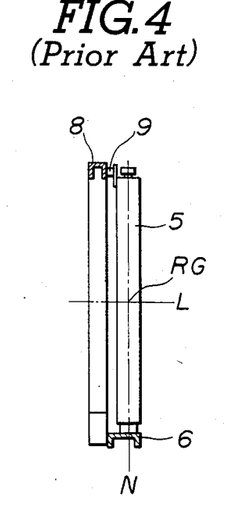
FIG. 4 is a schematic side view of a conventional vibration damping system applicable to the vehicle shown in FIG. 1.
Figure 5:
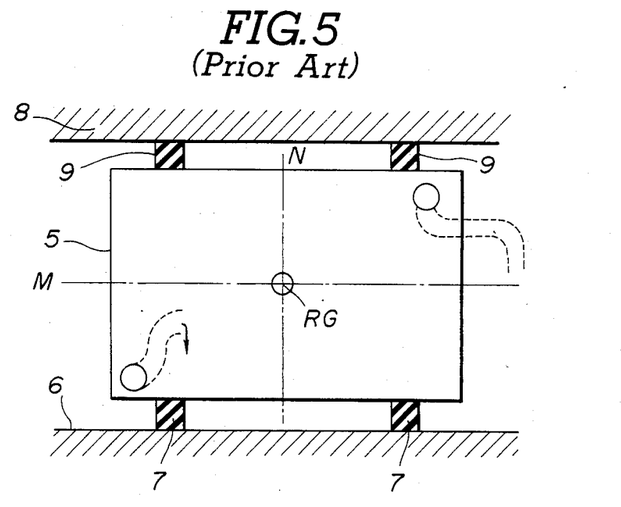
FIG. 5 is a schematic front elevation of the conventional vibration damping system of FIG. 4.

In order to suppress such low frequency vibrations as much as possible, a variety of structures or vibration damping systems have been proposed. One such system is shown in FIGS. 4 and 5, in which a radiator 5 is supported at its lower end section on a first cross-member 6 through bumper rubbers 7, and further supported at its upper end section to a radiator core support 8 through bumper rubbers 9. Additionally, the natural frequency of the radiator 5 is set at a suitable value within a range between 20 pl Hz and 30 Hz by virtue of the bumper rubbers 7, 9, the suitable value not overlapping the resonance frequency in vehicle body flexural vibration, thus causing the radiator 5 to serve as a dynamic damper.

Figure 6:
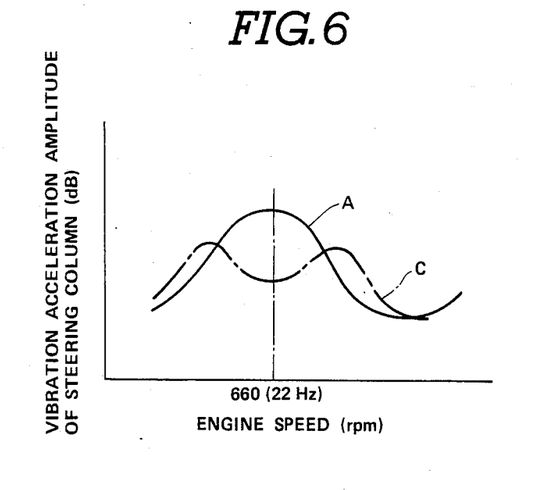
FIG. 6 is a graph showing the relationship between the steering system vibration characerisitcs of FIG. 3 and theoretical steering system vibration characteristics.

With the thus arranged vibration damping system, the natural frequency of the radiator 5 is separate from the resonance frequency in vehicle body flexural vibration, and therefore the steering system theoretically vibrates as in a steering system (column) vibration curve C in the FIG. 6 in case where the radiator 5 makes its pure bouncing resonance. As a result, the vibration of the steering system as a whole can be suppressed to low levels in the case where the radiator 5 serves as the dynamic damper as compared with the case where a radiator does not serve as the dynamic damper.

Figure 7:
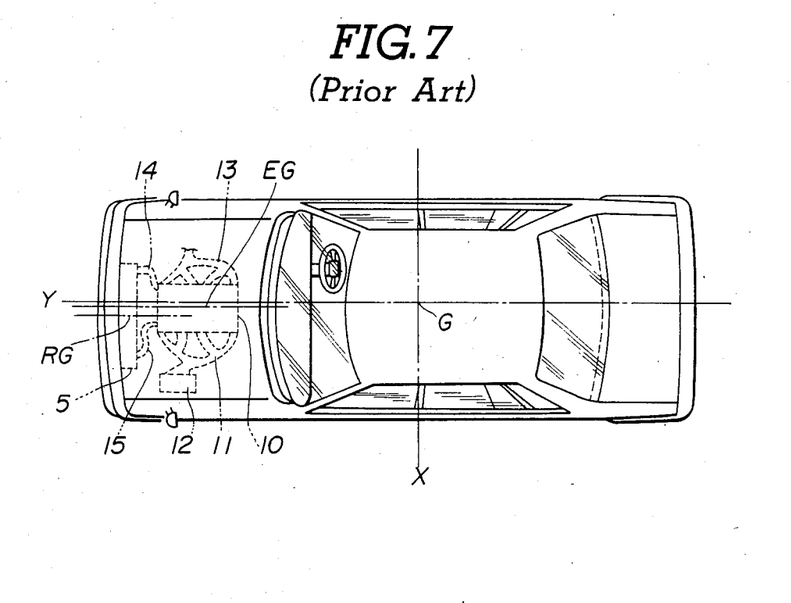
FIG. 7 is a plan view of an automotive vehicle showing an arrangement illustrating the relationship between the center of gravity of an engine and that of a radiator.

However, it is to be noted that actual vibration of the radiator 5 includes various vibration components such as bouncing (parallel vibration in the direction of a vertical axis N), pitching (rotational vibration around a minor horizontal axis L, rolling (rotational around vibration around a major horizontal axis M) etc as seen from FIGS. 4 and 5. It will be understood that the axes M, N and L intersect each other at the center of gravity RG of the radiator 5. The bouncing and pitching come out in combined form. Furthermore, as shown in FIG. 7, various parts of different sizes are disposed on right and left sides of an internal combustion engine 10, the parts being an intake manifold 11, an air filter 12, an exhaust manifold and the like. Accordingly, the center of gravity EG of the engine 10 and the center of gravity RG of the radiator 5 do not lie on the center axis (axis y) so as to be shifted rightward relative to the center axis. In addition, due to such shifting of the centers of gravity EG, RG and to other causes in connection with design, radiator 5 has natural frequencies in pitching and bouncing which are relatively close to each other.

Figure 9:
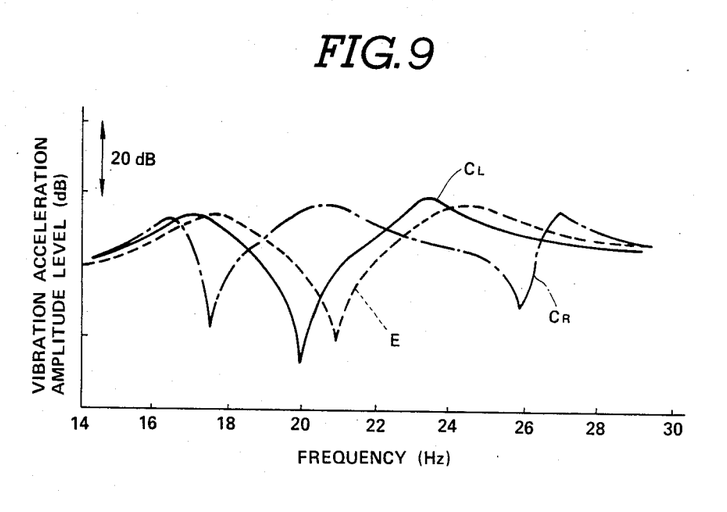
FIG. 9 is a graph showing vehicle body vibration characteristics depending upon measured values and theoretical values.

The calculation of vibration acceleration amplitude level of the radiator 5 unavoidably reveal a curve (at acutal or measured values) $C_R$ in FIG. 9 which deviates from the desired curve $C_L$ (at theoretical values). As a result, it will be understood that even if the bouncing natural frequency of the radiator 5 is shifted from the vehicle body flexural vibration resonance frequency, the pitching natural frequency of the radiator 5 still exists within the range of the vehicle body flexural vibration resonance frequency.

Figure 8:
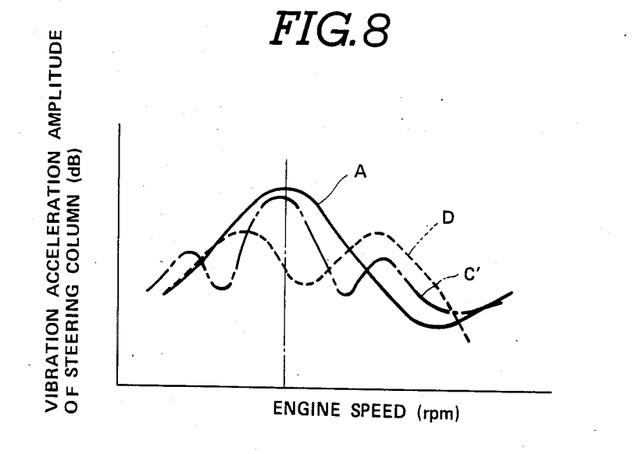
FIG. 8 is a graph showing the relationship among the steering system vibration characteristics of FIG. 3, conventional steering system vibration characteristics, and theoretical steering vibration characteristics.

Therefore, although the radiator 5 is intended to serve as the dynamic damper as discussed above, the vibration of the steering system becomes, in practice, of a steering vibration curve C' in FIG. 8, so that the vibration amplitude of the steering system (column) can be reduced as compared with the case where the radiator 5 does not serve as the dynamic damper; however, it is difficult to sufficiently reduce the steering system vibration amplitude as in the steering system vibration curve C in FIG. 6. Curve D illustrates theoretical steering vibration characteristics.

In this regard, it is desirable to cause the steering system vibration curve including the combined vibrations of bouncing and pitching to approach a steering system vibration curve E or practical ideal curve (in FIG. 9) which is obtained on assumption that the radiator 5 bounces and pitches. In this connection, it is desirable that the vibration acceleration amplitude level is that represented by curve E (at practical and theoretical values) in FIG. 9.

Otherwise, in the event that surging of the engine 10 occurs due to engine speed change, the radiator 5 unavoidably vibrates such that radiator hoses 14, 15 are forced to be extended or compressed, which in turn causes the radiator 5 to roll. When a large relative displacement is made between the engine 10 and the radiator 5 upon such radiator rolling, there is the possibility that the radiator hoses 14, 15 will interfere with other parts, thereby resulting in undesirable effects. Furthermore, such radiator rolling will cause the vibration characteristics of the radiator 5 to shift from the designed characteristics, so that the radiator 5 cannot function as a dynamic damper in a frequency range where the radiator 5 is intended to serve most effectively as the dynamic damper.

In view of the above description of the conventional low frequency vibration damping system, reference is now made to FIGS. 10 to 16, wherein a preferred embodiment of a low frequency vibration damping system of an automotive vehicle, according to the present invention is illustrated in association with a vehicle body 16. A steering column 17 is installed in the vehicle body 16 and is provided with a steering wheel 18. An engine 20 is disposed in an engine compartment 19 defined in the vehicle body 16. The engine 20 is provided with an intake manifold 21 and an exhaust manifold 22. Additionally, a radiator 23 is disposed in the engine compartment 19 and fluidly connected to the coolant passage (not shown) of the engine 20.

Figure 10:
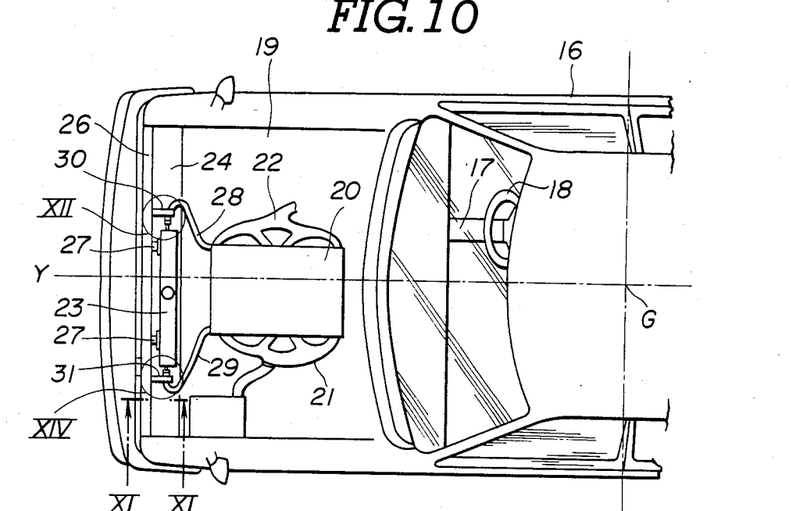
FIG. 10 is a plan view of a preferred embodiment of an automotive vehicle vibration damping system in accordance with the present invention.
Figures 11, 12, 13:
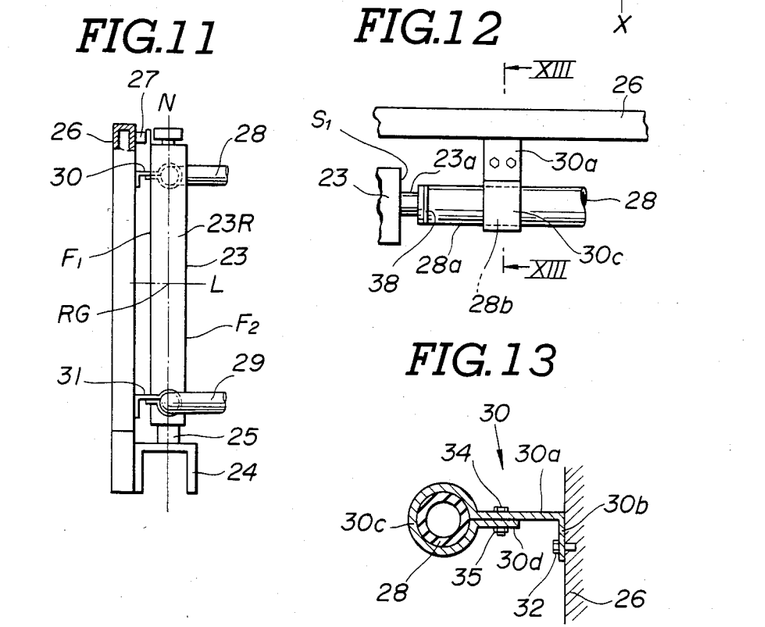
FIG. 11 is a cross-sectional view taken in the direction of arrows substantially along the line XI—XI of Fig. 10.
FIG. 12 is an enlarged fragmentary view of a part XII of FIG. 10.
FIG. 13 is a cross-sectional view taken in the direction of arrows substantially along the line XIII—XIII of FIG. 12.

The radiator 23 is supported at its lower end section on a first cross-member 24 through bumper rubbers (or elastic members) 25, and connected at its upper end section to the upper end section of a radiator core support 16 through bumper rubbers (or elastic members) 27 as shown in FIGS. 10 and 11. The first cross-member 24 is fixedly disposed so as to extend parallel with the axis X. The radiator core support 26 forms part of the vehicle body 16 and is disposed to extend parallel with the first cross-member 24 in such a manner that a core 23R of the radiator 23 is secured to the radiator core support 26. The radiator core 23R has front and rear vertical faces $F_1$, $F_2$ which are parallel with each other and extend perpendicular to the first cross-member 24. As clearly shown in FIGS. 12 and 14, a first radiator hose 28 is provided to connect a coolant inlet pipe 23a of the radiator 23 to a coolant outlet (no numeral) of the coolant passage of the engine 20. A second radiator hose 29 is provided to connect a coolant outlet pipe 23b of the radiator 23 to a coolant inlet (no numeral) of the coolant passage of the engine 20. The radiator coolant inlet pipe 23a is projected from a side face $S_1$ of the radiator 23 and extends straight along the radiator core support 26 or in the direction of the axis M. Similarly, the radiator coolant outlet pipe 23b is projected from an opposite side face $S_2$ of the radiator 23 and extends straight along the radiator core support 26 and in the direction of the axis M. The first radiator hose 28 has an end section 28a on the side of the radiator 23, so that the end section 28a is directly connected to the coolant inlet pipe 23a of the radiator 23. Similarly, the second radiator hose 29 has an end section 29a on the side of the radiator 23, so that the end section 29a is directly connected to the coolant outlet 23b of the radiator 23.

Figures 14, 15:
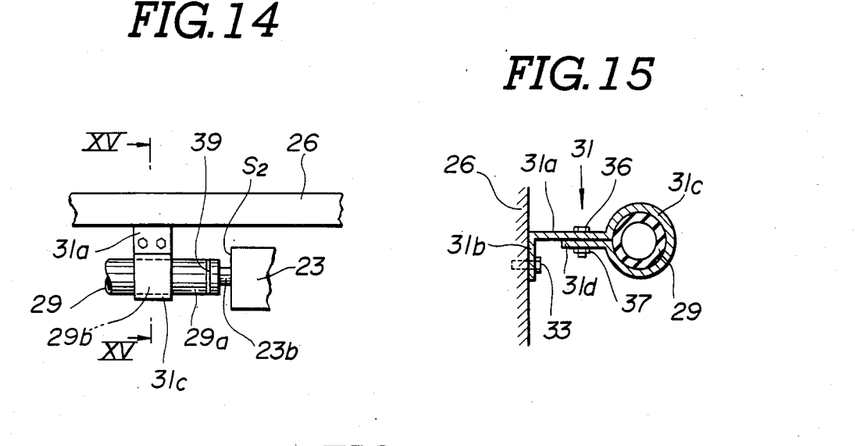
FIG. 14 is an enlarged frequenecy view of a part XIV of FIG. 10.
FIG. 15 is a cross-sectional view taken in the direction of arrows substantially along the line XV—XV of FIG. 14.

As viewed in FIGS. 12 and 13, an installation bracket 30 is provided to securely connect a vicinity or fixing section 28a of the first radiator hose end section 28a to the radiator core support 26. Another installation bracket 31, shown in FIGS. 14 and 15, is provided to securely connect a vicinity or fixing section 29b of the second end section 29a to the radiator core support 26. Accordingly, the first radiator hose end section 28a extends along the radiator core support 26 or in the direction of the axis M, so that the axis of the end section 28a is generally in alignment with the axis of the radiator coolant inlet pipe 23a. Similarly, the second radiator hose end section 29a extends along the radiator core support 26 or in the direction of the axis M, so that the axis of the end section 29a is generally in alignment with the axis of the radiator coolant outlet pipe 23b. The installation bracket 30 includes a proper section 30a of the flat-plate shape. The proper section 30a is integrally formed at one end thereof with an installation base section 30b and at the other end thereof with a generally C-shaped cylindrical hose receiving section 30c in such a manner that one end of the C-shaped hose receiving section 30c is integral with the proper section 30a. Additionally, a fastening end section 31d is provided to be integral with the other end of the C-shaped hose receiving section 30c. Similarly, the installation bracket 31 includes a proper section 31a of the flat-plate shape, an installation base section 31b integral with the proper section 31a at one end, a generally C-shaped cylindrical hose receiving section 31c integral with the proper section 31a at the other end, and a fastening end section 31d integral with the hose receiving section 31c.

The installation base section 30b of the installation bracket 30 is fixed onto the radiator core support 26 by means of a bolt 32, whereas the installation base section 31b of the installation bracket 31 is fixed onto the radiator core support 26 by means of a bolt 33. The fixing section 28b of the radiator hose 28 is inserted in the hose receiving section 30c of the installation bracket 30 and fastened in position by tightening a bolt 34 and a nut 35 so that the fastening end section 30d is fixed to the proper section 30a. Similarly, the fixing section 29b of the radiator hose 29 is inserted in the hose receiving section 31c of the installation bracket 31 and fastened in position by tightening a bolt 36 and a nut 37 so that the fastening end section 31d is fixed to the proper section 31a.

Figure 16:
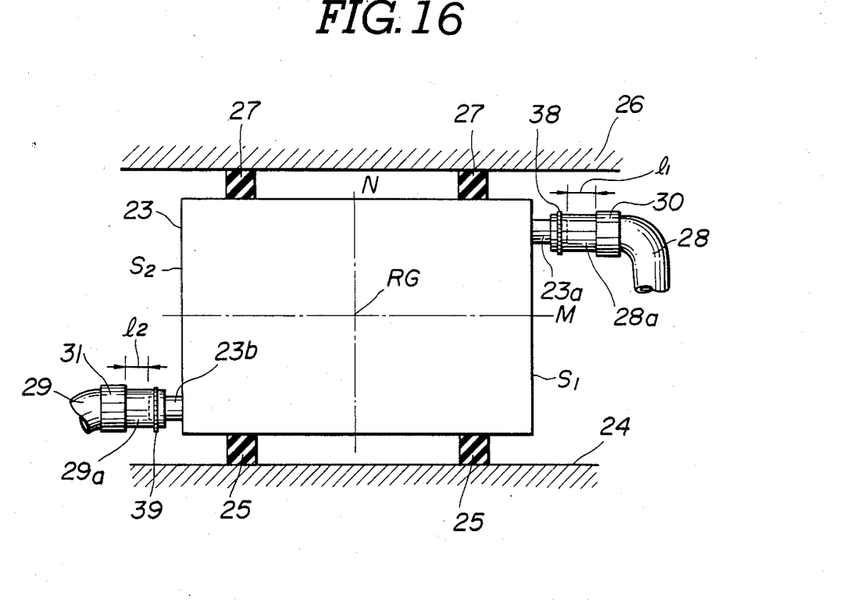
FIG. 16 is a schematic elevation of the vibration damping system of FIG. 10.

It is to be noted that by virtue of the bumper rubbers 25, 27, the natural bouncing vibration frequency $f_{RB}$ of the radiator 23 is set in a range which does not overlap or separates from the resonance frequency $f_B$ in flexural vibration of the vehicle body 16 and the resonance frequency $f_S$ of the steering column 17. For example, assuming that the vehicle body flexural vibration resonance frequency $f_B$ is 22 Hz and the steering column resonance frequency $f_S$ is 30 Hz, the bouncing natural frequency $f_{RB}$ of the radiator 23 is set in a range (22 Hz $< f_{RB} <$ 30 Hz) higher than 2 Hz and lower than 30 Hz. In addition, the natural frequency $f_{RP}$ of the radiator 23 in pitching is set at a value sufficiently higher than the steering column resonance frequency $f_s$ by virtue of the elasticity of the end sections 28a, 29a of the first and second radiator hoses 28, 29. For example, assuming that the steering column resonance frequency $f_S$ is 30 Hz as described above, the pitching natural frequency $f_{RP}$ of the radiator 23 is set at about 50 Hz. It will be understood that this radiator pitching natural frequency $f_{RP}$ can be changed by altering the position of the fixing section 28b, 29b at which the radiator hose 28, 29 is secured to a vehicle body side or the radiator core support 26 in this embodiment. That is to say, as shown in FIG. 16, assuming that the length $\lambda_1$ is a distance between the extreme end of the radiator coolant inlet pipe 23a and the installation bracket 30 while the length $\lambda_2$ is a distance between the extreme end of the radiator coolant outlet pipe 23b and the bracket 31, the vibration characteristics (particularly the pitching natural frequency) of the radiator 23 can be changed by adjusting the lengths $\lambda_1$ and $\lambda_2$. In FIG. 16, the reference numerals 38, 39 indicate fastening bands for fastening the radiator hose end sections 28a, 29a to the radiator coolant inlet and outlet pipes 23a, 23b respectively.

The manner of operation of the thus configurated automotive vehicle vibration damping system will be discussed hereinafter.

It is to be noted that the end sections 28a, 29a of the radiator hoses 28, 29 are so configured as to have a spring constant in the axial direction or in the direction of the axis X of the vehicle body 1, sufficiently larger than a spring constant in the vertical direction or in the direction of the axis Z of the vehicle body 1. By virtue of this, the spring or biasing force of the radiator hose end sections 28a, 29a acts on the resonance vibration of the radiator 23 in pitching vibration but does not act on the resonance vibration in bouncing vibration. That is to say, the spring force of the radiator hose end sections 28a, 28b function to suppress or damp only the pitching of the radiator 23 within the frequency range lower than 50 Hz but never suppress the bouncing resonance vibration.

As a result, the radiator 23 makes its bouncing resonance vibration within the range of $f_{RB}$ higher than 22 Hz and lower than 30 Hz under the action of the bumper rubbers 25, 27. It is to be noted that the amplitude of such bouncing resonance vibration has a peak value within the range of the bouncing natural frequency $f_{RB}$ of the radiator 23, i.e., within the range of 22 Hz $< f_{RB} <$ 30 Hz, and has smaller values as the vibration frequency apprfaches 22 Hz or 30 Hz. That is to say, at the frequencies of 22 Hz and 30 Hz, the radiator 23 hardly vibrates under the actions of force of inertia due to the mass itself and of the bumper rubbers 25, 27. Accordingly, when the vibration at 2 Hz or b 30 Hz is input from the vehicle body side to the radiator side, only the bumper rubbers are brought into the compressed and non-compressed states or into the bent state, so that the vibration at 22 Hz or 30 Hz from the vehicle body side can be suppressed by virtue of the mass of the radiator 23. Thus, the radiator 23 serves as the dynamic damper at the vibration frequency of 22 Hz and 30 Hz, thereby effectively suppressing the vehicle body side vibration at 22 Hz and 30 Hz.

Accordingly, although the vehicle body 16 is brought into a condition where its flexural resonance vibration will be made when the engine 20 runs at an engine speed of 660 rpm generating vibration at 22 Hz (in the second harmonics) and the steering column 17 is brought into a condition where its resonance vibration will be made when the engine 20 runs at an engine speed of 900 rpm generating vibration at 30 Hz (in the second harmonics), the flexural resonance vibration of the vehicle body 16 and the resonance vibration of the steering column 17 can be effectively suppressed under the actions of the radiator 23 and the bumper rubbers 25, 27.

In addition, if a pulling force or a compressing force is applied to the radiator hoses 28, 29 upon surging of the engine 20 due to an engine speed change, such a force never acts on the radiator 23. As a result, the radiator 23 does not roll due to engine surging, so that the radiator hoses 28, 29 are prevented from being largely displaced, thereby avoiding interference with other parts and the change in vibration characteristics of the radiator 23 itself.

What is claimed is:

1. A vibration damping system of an automotive vehicle, comprising:
   a radiator having a vertical axis, a major horizontal axis, and a minor horizontal axis;
   elastic radiator hoses through which said radiator is fluidly connnected to an engine mounted on a vehicle body, said elastic radiator hoses respectively having end sections at which said radiator hoses are connected to and extend from said radiator in a direction that is substantially parallel with said major horizontal axis;
   elastic members through which said radiator is elastically connected to the vehicle body, said elastic members being so constructed and arranged to allow a first natural frequency of said radiator in bouncing to be separate from a resonance frequency of the vehicle body in flexural vibration and from a resonance frequency of a steering column on which a steering wheel is mounted; and
   means for fixing at least one of said end sections of said radiator hoses to the vehicle body in such a manner that said at least one end section functions to substantially suppress pitching of said radiator while not suppressing said bouncing so that said radiator has a second natural frequency in pitching higher than said first natural frequency.

2. A vibration damping system as claimed in claim 1, wherein said elastic radiator hoses include a first elastic radiator hose through which engine coolant flows from the engine to said radiator, and a second elastic radiator hose through which engine coolant flows from said radiator to the engine, in which said end sections include a first end section forming part of said first radiator hose, and a second end section forming part of said second radiator hose.

3. A vibration damping system as claimed in claim 2, wherein at least one of said first and second radiator hoses has a fixing section through which said radiator hose is fixedly connected to said vehicle body, said fixing section being integral said end section.

4. A vibration damping system as claimed in claim 3, wherein said fixing means is constructed and arranged to so maintain said end section integral with said fixing section as to extend substantially parallel to the major horizontal axis of a core of said radiator.

5. A vibration damping system as claimed in claim 2, in which said first and second radiator hoses respectively have first and second fixing sections at which said first and second radiator hoses are fixedly connected to said vehicle body, said first and second fixing sections being respectively integral with said first and second end sections.

6. A vibration damping system as claimed in claim 5, wherein said fixing means is constructed and arranged to maintain said first and second end sections so as to extend substantially parallel to the major horizontal axis of a core of said radiator.

7. A vibration damping system as claimed in claim 6, wherein the vehicle body includes a radiator core support extends substantially parallel to the major horizontal axis of said radiator core.

8. A vibration damping system as claimed in claim 7, wherein said fixing means includes a first installation bracket for fixedly connecting said first radiator hose first fixing section to said radiator core support, and a second installation bracket for fixedly connecting said second radiator hose second fixing section to said radiator core support.

9. A vibration damping system as claimed in claim 8, wherein said radiator includes a coolant inlet pipe to which said first radiator tube is directly connected, said inlet pipe being located on a first side face of said radiator and extending substantially parallel to the major horizontal axis, coolant outlet pipe to which said second radiator tube is directly connected, said outlet pipe being located on a second side face of said radiator and extending substantially parallel to the major horizontal axis.

10. A vibration damping system as claimed in claim 9, whererin each of first and second radiator hoses has a first spring constant in its axial direction and a second spring constant in a vertical direction of said radiator core, said first spring constant being larger than said second spring constant.

11. A vibration damping system as claimed in claim 10, wherein said first installation bracket is so located as to be separate from an extreme end of said inlet pipe by a first distance, and said installation bracket is so located as to be separate from an extreme end of said outlet pipe by a second distance.

12. A vibration damping system as claimed in claim 11, wherein said elastic members include first and second elastomeric members interposed between a lower end section of said radiator and a cross member forming part of said vehicle body and elongating along the radiator lower end section, and third and fourth elastomeric members interposed between a upper end section of said radiator and said radiator core support.

13. A vibration damping system as claimed in claim 12, wherein said radiator is so located that the vertical face of said core is parallel with a vertical plane to which a longitudinal axis of the vehicle is perpendicular.

14. A vibration damping system as claimed in claim 13, wherein each of said first and second installation brackets includes a horizontally elongated first section, a vertically elongated second section integrally connected with said first section at a first end, said second section being secured to said radiator core support, a generally C-shaped third section whose first end is integrally connected with a second end of said first section, said third section receiving therein said radiator hose fixing section, and a horizontally elongated fourth section integrally connected with a second end of said third section and secured to said first section so that said radiator hose fixing section is fixedly received by said third section.

15. A vibration damping system as claimed in claim 1, wherein said second natural frequency of said radiator is higher than said resonance frequency of said steering column.

16. A vibration damping system as claimed in claim 15, wherein said first natural frequency is higher than said resonance frequency of the vehicle body in flexural vibration and lower than said resonance frequency of said steering column.

* * * * *